United States Patent Office 3,025,329
Patented Mar. 13, 1962

3,025,329
HALOGENATED DERIVATIVES OF
CYCLODODECATRIENE
Anthony H. Gleason, Scotch Plains, N.J., assignor to Esso Research and Engineering Company, a corporation of Delaware
No Drawing. Filed Mar. 2, 1959, Ser. No. 796,203
4 Claims. (Cl. 260—648)

The present invention relates to new compositions of matter and to methods of preparation of these new compositions of matter. More particularly, this invention relates to the preparation of 9-halo-1,5-cyclododecadiene and to 9,5, 9,6 or 10,5-dihalo-1-cyclododecene. Yet more particularly, this invention relates to the preparation of the above identified compositions by the addition of a halogen acid to one or two of the double bonds of 1,5,9-cyclododecatriene. More particularly, this invention relates further to the preparation of cyclododecene by hydrogenating 9-halo-1,5-cyclododecadiene to the paraffin and then dehydrohalogenating to the cyclic monoolefin.

The 1,5,9-cyclododecatriene starting material of this invention is known in the art, being prepared by trimerizing butadiene with alkyl metal type catalysts, its preparation being described, for example, in Angewante Chemie, vol. 69, No. 11: 397 (June 7, 1957). Although four stereo isomers of 1,5,9-cyclododecatriene are theoretically possible only two have thus far been isolated. These are the cis, trans, trans (cis., tr., tr.) and the trans, trans, trans (tr., tr., tr.) as shown by the formulas below.

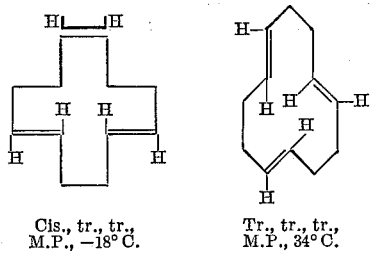

Cis., tr., tr.,
M.P., −18° C.

Tr., tr., tr.,
M.P., 34° C.

Throughout this specification it will be assumed that either of the isomers above represented or of the other isomers may be utilized or mixtures thereof.

The present invention mono- and di-halogen derivatives are useful in the preparation of many products. Particularly, the monohalo derivative is useful in the preparation of cyclododecene prepared by the technique described above. The cyclododecene may be then oxidized to 1,12-dodecandioic acid. This 1,12-dodecandioic acid is of great value as a starting material in the manufacture of poly esters and of super poly amides. The suitableness of this material as a nylon 66 type intermediate, for example, is obvious. Thus, nylon 66 is obtained by the poly condensation of hexamethylene diamine with adipic acid and fiber materials made from higher molecular weight intermediates such as the present 1,12-dodecandioic acid also have been prepared. They are now being evaluated for various commercial uses.

Additionally, since the commercial use of chlorinated paraffin waxes at this time is well known, it is apparent that the mono- and di-substituted halogen derivatives will be of use as substitutes for these materials. These chlorinated paraffins, for example, are useful in the preparation of flame-proof or flame retardant paints and in the manufacture of flame-proof textile materials. Additionally, they have found use in plasticizers and in plasticizer extenders for plastics and synthetic rubbers, and in extreme pressure lubricants.

The 9-bromo-1,5-cyclododecadiene new composition of matter of the present invention was found to have a boiling point of 81° C. at 0.3 mm. pressure, the percent bromine found was 32.7 wt. percent as compared to 32.9 wt. percent theoretical. The iodine number of the compound was found to be 206.7 as compared to 209 theoretical.

An impure 9,5, 9,6 or 10,5-dibromo-1-cyclododecene new composition of matter of the present invention was found to contain 44.5 wt. percent bromine as compared with theoretical 49.5 wt. percent. In this dibromo compound the second bromine atom adds across the double bond connecting the 5 and 6 carbon atoms. Therefore, this material can be characterized and described as $x,y$-dibromo-1-cyclododecene wherein $x$ is selected from the group consisting of the numbers 5 and 6 and $y$ is selected from the group consisting of the numbers 9 and 10.

Mono- and dihalo derivatives of the present invention are prepared by reacting 1,5,9-cyclododecatriene with a halogen acid at temperatures of 0 to 200° C. and pressures of 1 to 150 atmospheres. Hydrohalogenation catalysts may be used such as acylperoxide catalysts, hydrogen peroxide catalysts, alkyl or aralkyl peroxide catalysts and metal halide catalysts. Hydrocarbon solvents such as aromatics, preferably benzene, and diethyl ether may be utilized. In the preparation generally of halogen compounds of the present invention any of the well known hydrohalogenation catalysts may be used, the order of reactivity of the acids being HI→HBr→HCl→HF. Solvents may be used due to the limited solubility of the halogen acids but they are less important where superatmospheric pressure conditions are used. To obtain preferentially the dihalogen derivative 2–3 moles halogen acid gas per mole of cyclododecatriene and more severe conditions are used, and to obtain preferentially the monohalogen derivative 0.75–1.25 moles halogen acid gas per mole of cyclododecatriene and less severe conditions are used. In the preparation of mono- and dibromides it is preferred to react cyclododecatriene with hydrobromic acid in the presence of benzoyl peroxide catalyst at temperatures of 0 to 75° C., preferably 25–50° C. and pressures of 1 to 5 atmospheres in the presence of a hydrocarbon solvent. Also, in the preparation of these bromo derivatives it is preferred to utilize ratios of solvent to cyclododecatriene in the range of 0.5 to 1 to 5 to 1 and to utilize amounts of hydrogen bromide in the range of 45 to 70 wt. percent where larger amounts of the monobromide derivative are desired and 60 to 90 wt. percent where larger amounts of the dibromide derivative are desired.

Monohalo cyclododecadiene or dihalo cyclododecene may be hydrogenated to the saturated compounds utilizing a hydrogenation catalyst. Care in the choice of this catalyst should be used to limit dehydrohalogenation although any hydrogenation catalyst can be used under suitable reaction conditions. A palladium on charcoal, platinum on charcoal or platinum oxide catalyst preferably a 0.2 to 1 wt. percent palladium on charcoal catalyst is preferred. Temperatures of 10–35° C. and pressures of 1–10 atmospheres may be used. Additionally, a hydrocarbon solvent such as tetrahydrofuran can be used. In this reaction in the case of the monobromo cyclododecadiene it was noted that substantially none of the halogen present was stripped from the compound. This is unexpected in that ordinarily hydrogenolysis would be expected to occur. Obviously, this contributes much to the economic attractiveness of the process. The saturated monohalogen derivative may be useful in the preparation of Grignard reagents and for making other derivatives.

To obtain cyclododecene or cyclododecadiene, the saturated monohalide if the former is desired or dihalide if the latter is desired, is dehydrohalogenated by reacting it at temperatures of 75 to 500° C. in the presence of a suitable catalyst. It is preferred to react these materials at temperatures of 250 to 500° C. and pressures of 10 mm. to 1 atmosphere if soda lime is used as a catalyst and to react these materials at 75 to 150° C. and 1 to 5 atmospheres pressure if a tertiary amine catalyst such as quinoline or dimethyl aniline is used as a catalyst. The reaction proceeds smoothly and yields in the order of 90% are obtained. It should be noted that thus, for example, cyclododecadiene is prepared by starting with a dihalocyclododecene, hydrogenating as above described to the dihalosaturated material and then dehydrohalogenating to obtain a cyclododecadiene wherein the unsaturated linkages are not adjacent to each other.

For the purpose of illustrating the present invention the following laboratory preparation of 9-bromo-1,5-cyclododecadiene; 9, 5 or 6-dibromo-1-cyclododecene and bromocyclododecane are presented in Examples 1 and 2. The preparation further of cyclododecene is described in Example 3.

*Example 1*

Approximately 110 g. of dry gaseous HBr was passed slowly into a solution of 162 g. cis., tr., tr. 1,5,9-cyclododecatriene and 200 ml. benzene containing one gram of benzoyl peroxide over a period of six hours at 26° to 35° C. and allowed to stand overnight. Not all of the HBr was absorbed. The solution was then blown free of unreacted HBr with dry nitrogen and fractionally distilled at 0.3 mm. pressure to separate benzene, unreacted cyclododecatriene, monobromide and polybromides. Approximately 50 g. of cyclododecatriene was recovered, 170 g. of monobromide (B.P. 81° C. at 0.3 mm. pressure) and about 40 g. of residue consisting principally of the dibromide. The monobromide was found to contain 32.7 wt. percent bromine as against 32.9 wt. percent theoretical and had an iodine value of 206.7 mg./g. as against 209 theoretical. The impure residue contained 44.5 wt. percent bromine as compared with a theoretical of 49.5 wt. percent for the dibromide.

*Example 2*

To 55 g. of 9-bromo-1,5-cyclododecatriene there was added 200 ml. of tetrahydrofuran together with 10 grams of powdered calcium carbonate and hydrogenation was conducted with 0.3 g. palladium on charcoal catalyst at 25° C. at a pressure of 30 to 60 p.s.i.g. Hydrogen absorption was rapid and the theoretical amount of hydrogen was taken up in about two hours. The catalyst was removed by filtration and the solvent was stripped under vacuum leaving almost pure bromocyclododecane. The wt. percent bromine was found to be 33.8 as compared with a theoretical of 32.5 wt. percent.

*Example 3*

Gaseous bromocyclododecane is dehydrohalogenated by passage over soda lime at 380–400° C. and a pressure of 100 mm. in a silica tube. Conversions of 50–60% with a selectivity of at least 90% are obtained.

What is claimed is:
1. The new composition of matter $x,y$-dibromo-1-cyclododecene wherein $x$ is 5 to 6 and $y$ is 9 to 10.
2. The new composition of matter monobromocyclododecane.
3. The new composition of matter 9-bromo-1,5-cyclododecadiene.
4. The new composition of matter 1,5-dibromocyclododecane.

References Cited in the file of this patent

Fieser et al.: "Organic Chemistry," D. C. Heath and Co. (1944), pp. 63 and 64.
Blomquist et al.: J.A.C.S., vol. 74, p. 3641 (1952).
Migrdichian: Organic Synthesis, vol. II, Reinhold Publishing Corp. (1957), pp. 862–967 and 838–9 relied on.